US 6,742,075 B1

(12) United States Patent
Bailey et al.

(10) Patent No.: US 6,742,075 B1
(45) Date of Patent: May 25, 2004

(54) ARRANGEMENT FOR INSTIGATING WORK IN A CHANNEL ADAPTER BASED ON RECEIVED ADDRESS INFORMATION AND STORED CONTEXT INFORMATION

(75) Inventors: Joseph A. Bailey, Austin, TX (US); Joseph Winkles, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 203 days.

(21) Appl. No.: 09/998,187

(22) Filed: Dec. 3, 2001

(51) Int. Cl.$^7$ ................................................ G06F 13/36
(52) U.S. Cl. ........................ 710/310; 710/9; 710/39; 710/40; 710/105; 710/112; 710/300; 710/305
(58) Field of Search ................ 710/9, 39, 40, 710/300, 105, 112, 305, 310

(56) References Cited

U.S. PATENT DOCUMENTS

| | | | |
|---|---|---|---|
| 5,513,368 A | * 4/1996 | Garcia, Jr. et al. | 395/842 |
| 6,026,448 A | * 2/2000 | Goldrian et al. | 710/712 |
| 6,161,160 A | 12/2000 | Niu et al. | |
| 6,199,124 B1 | * 3/2001 | Ramakrishnan et al. | 710/40 |
| 6,581,113 B1 | 6/2003 | Dwork et al. | |

OTHER PUBLICATIONS

Daniel Cassiday, InfiniBand™ Architecture Tutorial, Hot Chips, Sun Microsystems, Aug. 2000, 79 pages.

* cited by examiner

Primary Examiner—Jeffrey Gaffin
Assistant Examiner—Alan Chen
(74) Attorney, Agent, or Firm—Manelli Denison & Selter PLLC; Leon R. Turkevich

(57) ABSTRACT

A host channel adapter is configured for servicing a work notification, supplied by a host process to an assigned destination address accessable by the host channel adapter, based on matching the assigned destination address with a stored notification address from one of a plurality of queue pair context entries stored within the host channel adapter. The host channel adapter receives a queue pair context entry including a notification address, based on creation of a corresponding queue pair for a host process. The queue pair enables the host process to post a work descriptor and output a work notification to the host channel adapter by writing the work notification to an assigned destination address. The host channel adapter matches the assigned destination address with a stored notification address, and services the work descriptor based on the corresponding queue pair attributes specified in the identified queue pair context entry.

10 Claims, 3 Drawing Sheets

ARRANGEMENT FOR INSTIGATING WORK IN A CHANNEL ADAPTER BASED ON RECEIVED ADDRESS INFORMATION AND STORED CONTEXT INFORMATION

BACKGROUND OF THE INVENTION

1. Field of the Invention

The present invention relates to a host channel adapter configured for communication with target channel adapters in an InfiniBand™ server system, and more particularly to the servicing by the host channel adapter of work notifications, also referred to as "doorbells", that notify the host channel adapter of work queue entries to be serviced.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, accessibility, and serviceability.

In addition, processors used in servers have encountered substantial improvements, where the microprocessor speed and bandwidth have exceeded the capacity of the connected input/output (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between end nodes (e.g., central processing units, peripherals, etc.) and switches inside a server system. Hence, the term "InfiniBand™ network" refers to a private system area network (SAN) that connects end nodes and switches into a cluster within a server system, enabling the sharing of cluster resources. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading" processor code execution), hence offloading the operating system of the server system.

However, arbitrary hardware implementations may result in substantially costly or relatively inefficient hardware designs. One example involves the servicing of work notifications, also referred to as "doorbells". Doorbells are generated by verbs consumers (e.g., operating system supplied agents) that post a work request, for example a work queue entry (WQE) in system memory; the verbs consumer then sends the work notification to notify the host channel adapter of the work request in system memory.

Various implementations of the doorbell operations may require the host operating system to supply relevant information in the data field of the doorbell write operation, for example in the form of double words specifying respective parameter values (e.g., "SLID=12345"). However, there is a concern that imposing requirements for excessive information during a doorbell write operation may impose unnecessary processing requirements on the host operating system, adversely affecting operating system performance as the number of verbs consumers increase on the order of thousands or tens of thousands.

SUMMARY OF THE INVENTION

There is a need for an arrangement that enables a host channel adapter to be implemented in an efficient and economical manner.

There also is a need for an arrangement that enables a host channel adapter to be notified of incoming work requests in response to receipt of work notifications, with minimal resource requirements by host processes configured for generating the work notifications.

These and other needs are attained by the present invention, where a host channel adapter is configured for servicing a work notification, supplied by a host process to an assigned destination address accessable by the host channel adapter, based on matching the assigned destination address with a stored notification address from one of a plurality of queue pair context entries stored within the host channel adapter. The host channel adapter receives a queue pair context entry that specifies queue pair attributes, including a notification address, based on creation of a corresponding queue pair for a host process. The queue pair, having a send queue and a receive queue, enables the host process to post a work descriptor to its corresponding send queue, and output a work notification to the host channel adapter by writing the work notification to an assigned destination address. The host channel adapter, in response to detecting the work notification stored at the assigned destination address, identifies the queue pair context entry based on matching the corresponding stored notification address with the assigned destination address, and services the work descriptor stored in the send queue based on the queue pair attributes specified in the identified queue pair context entry.

Hence, the host channel adapter can identify and service work requests stored in an assigned queue, based on identifying the queue pair context entry based on the assigned destination address used to supply the work notification to the host channel adapter. Hence, the host channel adapter can service work descriptors based solely on the destination address used to supply the work notification, minimizing host processor resource requirements and ensuring scalability for the host resources by eliminating the necessity of creating a work notification as a new data structure requiring relevant data.

One aspect of the present invention provides a method in a host channel adapter. The method includes storing a queue pair context entry that specifies, for a corresponding queue pair, queue pair attributes including a corresponding notification address, and detecting a work notification for a work descriptor and that is written to a destination address. The method also includes identifying the queue pair context entry corresponding to the work descriptor based on a match between the destination address and the corresponding notification address, and servicing the work descriptor based on the queue pair attributes specified in the identified queue pair context entry.

Another aspect of the present invention provides a channel adapter. The channel adapter includes a queue pair attributes table configured for storing queue pair context entries specifying queue pair attributes, including notification addresses, for respective queue pairs. The channel adapter also includes a host manager configured for detecting a work notification for a work descriptor and that is written to a destination address. The host manager is configured for identifying, from the queue pair attributes table, one of the queue pair context entries as corresponding to the work descriptor based on a match between the destination address and the corresponding notification address. The host manager also is configured for retrieving the work descriptor based on the queue pair attributes specified in the one queue pair context entry.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
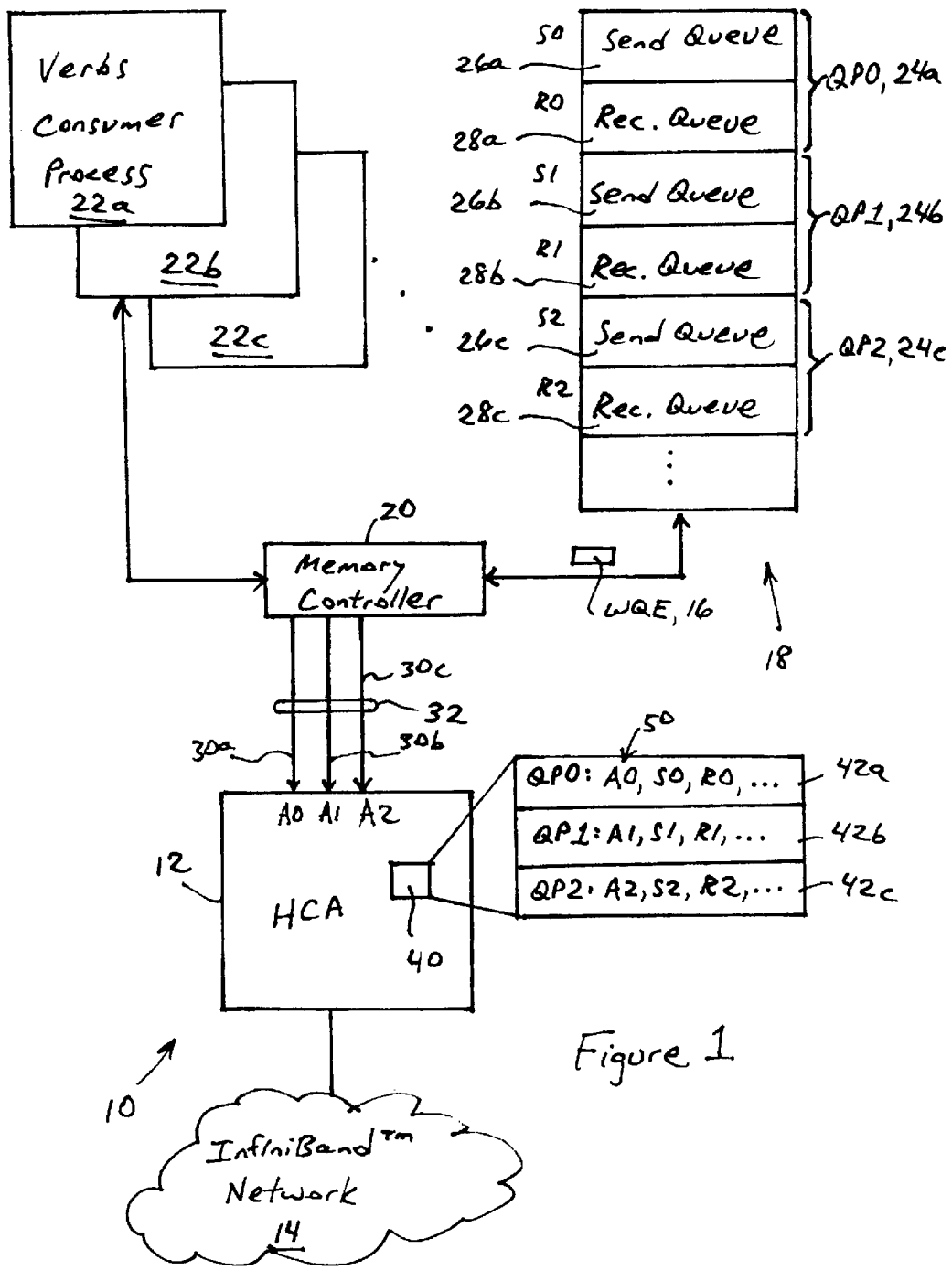
FIG. 1 is a diagram illustrating a host channel adapter configured for servicing work notification requests according to an embodiment of the present invention.

FIG. 1 is a block diagram illustrating a system 10 having a host channel adapter (HCA) 12 configured for generating and transmitting packets onto an InfiniBand™ network 14, according to an embodiment of the present invention. The HCA 12 is configured for sending and receiving data packets on the InfiniBand™ network 14 based on work queue entries (WQEs) (i.e., work descriptors) 16 stored in system memory 18. In particular, each verbs consumer process 22 executed by a processor is assigned a corresponding queue pair 24 including a send queue 26 and a receive queue 28. Each verb consumer process 22 requests work to be performed by the HCA 12, for example sending data to a destination, a remote direct memory access (RDMA) read operation, or an RDMA write operation, by sending the associated work descriptor 16 to the assigned queue 26 or 28. For example, if a verbs consumer process 22 wishes to send data, the corresponding WQE 16, also referred to as a send queue entry (SQE), is sent to the corresponding send queue 26; if the verbs consumer process 22 wishes to perform an RDMA read operation, the corresponding WQE 16, also referred to as receive queue element (RQE), is placed in the corresponding assigned receive queue 28. Note that an RDMA write operation by the verbs consumer process 22 may require a WQE 16 to be added to both the send queue 26 and the receive queue 28 of the corresponding queue pair.

The verbs consumer process 22 notifies the HCA 12 of the send queue entry added to the send queue 26 by generating a work notification 30 for the corresponding work descriptor 16. Hence, the work notification 30, also referred to as a "doorbell", is used by the verbs consumer process 22 to notify the HCA 12 that there is work to be performed, specified by a work descriptor 16 stored in the assigned send queue 26.

According to the disclosed embodiment, processing requirements associated with generating the work notification 30 are minimized by eliminating the necessity for generating a data structure for the work notification 30. In particular, the verbs consumer process 22 generates the work notification 30 by executing a write to a prescribed memory mapped I/O address 32 identifiable by the memory controller 20. In particular, the verbs consumer process 22 initiates a write operation to a specific memory mapped I/O address (e.g., A0) 32; since the data of the write carries no meaningful information, arbitrary data can be written without generation of a data structure.

The write operation requested by the verbs consumer process 22 causes the memory controller 20 to determine whether the logical address specified by the verbs consumer process 22 corresponds to a memory location of the system memory 16 (e.g., for storage of a work descriptor 16), or a write to a specific memory mapped I/O address in I/O memory space. For example, if the logical address specified by the verbs consumer process 22 corresponds to a memory mapped I/O address, the memory controller 20 performs the write operation for the specific memory mapped I/O address (e.g., A0). Hence, the verbs consumer process 22a requests work by sending the work descriptor 16 to the corresponding assigned send queue 26a, followed by executing a write operation to the corresponding assigned memory mapped I/O address A0 that serves as a work notification to notify the HCA 12 of the existence of the newly added work descriptor 16 in the send queue 26a.

As described above, the write operation to the specific memory mapped I/O address 30a does not include any meaningful write data. The HCA 12 identifies the send queue 26 corresponding to the work notification 30 based on context information stored within the HCA 12. In particular, the HCA 12 includes a queue pair attributes table 40 configured for storing queue pair context entries 42. Each queue pair context entry 22 is stored in the queue pair attributes table 40 during creation of the corresponding queue pair 24. The queue pair context entry 42 includes any necessary information associated with the corresponding queue pair, for example notification address (e.g., A0) 50, system memory address for a corresponding send queue 26 (e.g., S0), system memory address location for receive queue 28 (e.g., R0), queue pair number (e.g., queue QP0), as well as any additional transport related information.

Hence, the HCA 12 can determine the queue pair context for a received doorbell 30 based on the destination address (e.g., A0) used to write the doorbell 30 to the memory mapped I/O address space 32. The HCA 12 identifies the queue pair context entry 42 corresponding to the work descriptor 16 based on a match between the destination address (e.g., A0) used by the memory controller 20 to supply the work notification 30, and the notification address 50 stored in the queue pair context entry 42. Hence, the work descriptor 16 stored in the send queue 26 can be serviced by the HCA 12 based on the destination address 32 used to write the work notification 30, eliminating the necessity for any separate data structure to notify the HCA 12.

Figure 2:
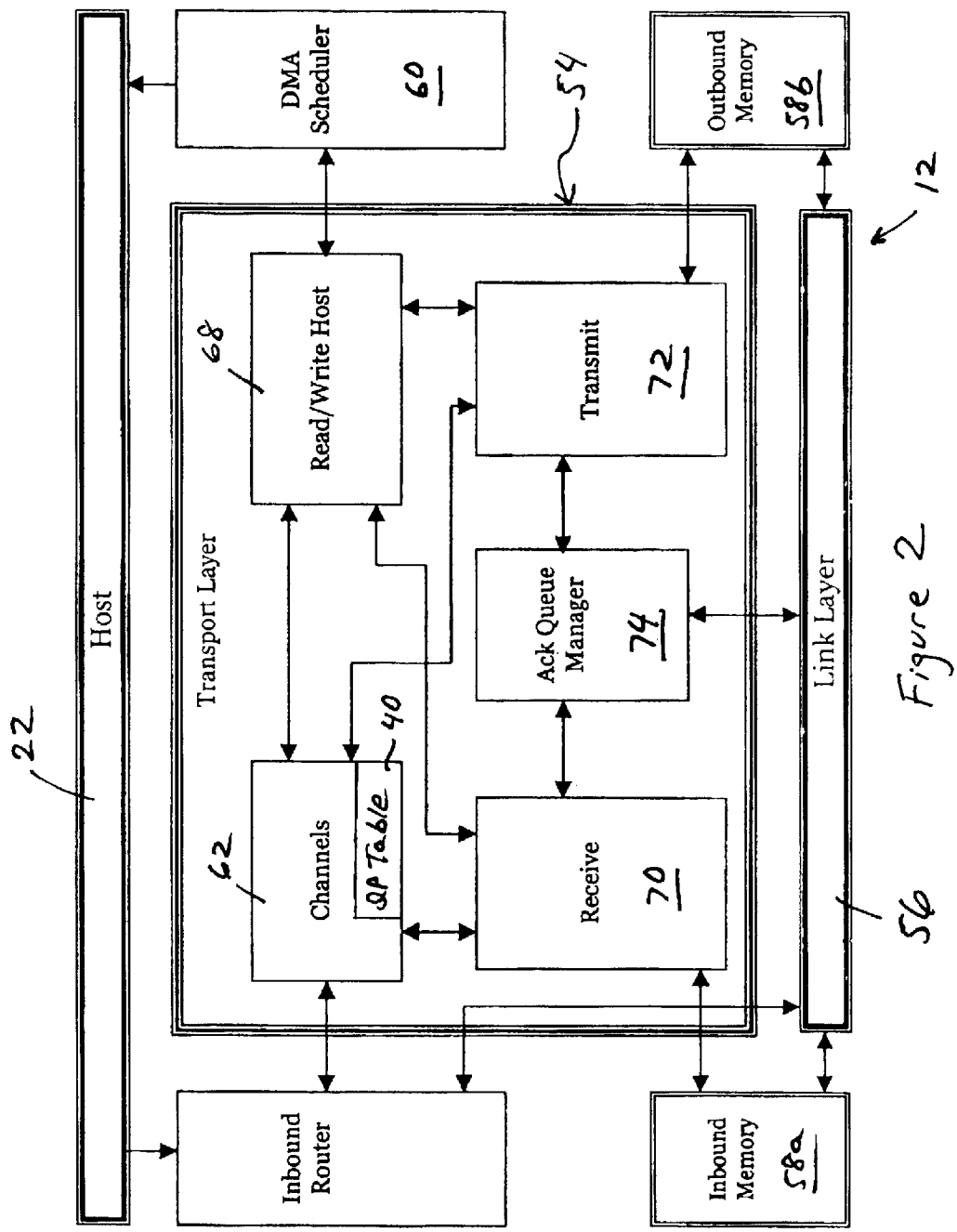
FIG. 2 is a diagram illustrating in detail the transport layer module of FIG. 1.

FIG. 2 is a block diagram illustrating in further detail the HCA 12 according to an embodiment of the present invention. The HCA 12 includes a transport layer 54, a link layer 56, memory buffers 58, and a DMA scheduler 60 configured for fetching the work descriptors 16 from the system memory 18.

The transport layer module 54 includes a channel module 62 having the queue pair attributes table 40. The transport layer module 54 also includes a read/write host manager 68 configured for managing read/write operations to and from the system memory 24 via the DMA scheduler 60, a receive service module 70, a transmit service module 72, and an acknowledgement queue manager 74.

The channels manager 62 is configured for managing transport services, including setup, management, and tear down of queue pairs, including storing a queue pair context entry 42 that specifies, for each corresponding queue pair 24, the necessary queue pair attributes including a corresponding notification address 50.

The receive service module 70 is configured for determining whether a receive message includes application based data for a verbs consumer 22, transport service information for the channel manager 62, or an acknowledgment for the acknowledgment queue manager 74.

The transmit service module 72 is configured for generating the appropriate transport layer headers for the retrieved WQEs 16 based on the associated queue pair attributes. The transmit service module 72 also manages transmission of acknowledgments according to connection based requirements (e.g., reliable connection, reliable datagram) specified by the acknowledgment queue manager 74.

The memory buffers 58a and 58b are used for storing received data and transmit data, respectively.

Figure 3:
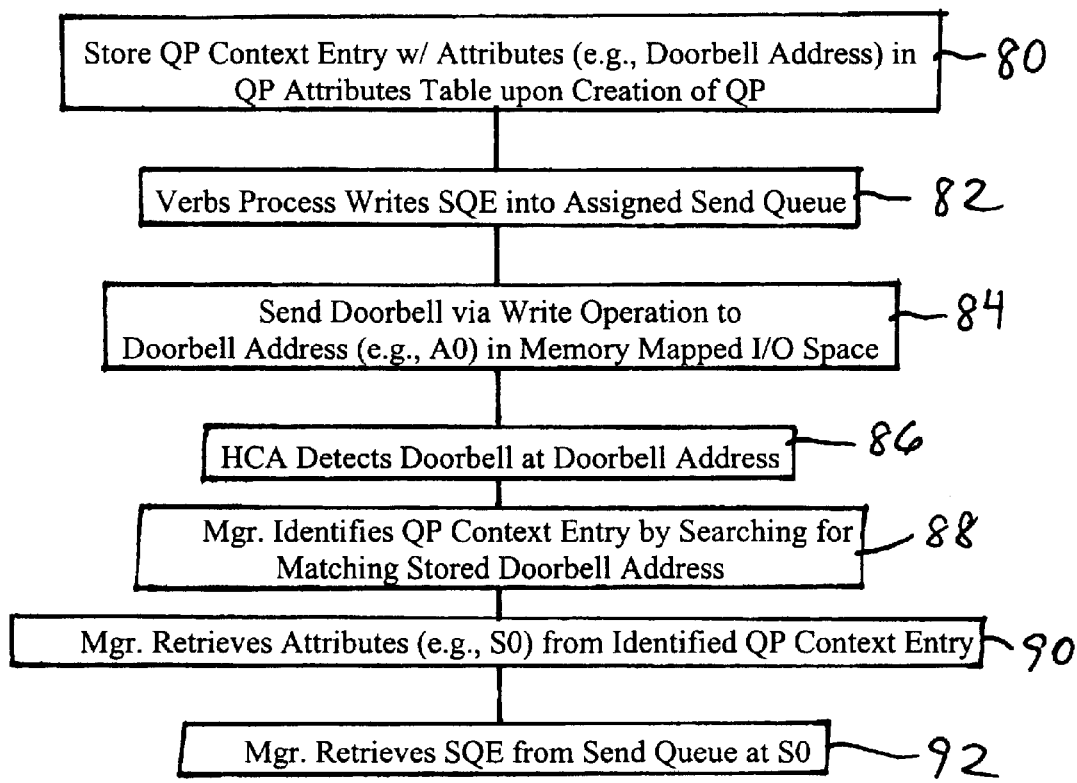
FIG. 3 is a diagram illustrating the method by the host channel adapter of FIG. 1 of servicing a work notification written to a destination address based on the destination address, according to an embodiment of the present invention.

FIG. 3 is a flow diagram illustrating the method of servicing a work descriptor 16 according to an embodiment of the present invention. The method begins in step 80, where a queue pair context entry is stored by the channels manager 62 that specifies, for a corresponding queue pair 24, the queue pair attributes including the corresponding notification address 50 used by the corresponding verbs consumer process 22 for writing a work notification. Once the context information is stored in the queue pair context entry 42 the HCA 12 can begin servicing work requests for the corresponding queue pair 24.

The verbs consumer process 22 initiates work by writing in step 82 the work descriptor (e.g., SQE) into its assigned send queue 26 in system memory 18. The verb consumer process 22 then writes in step 84 a work notification (i.e., "a doorbell") 30 to an assigned destination address identifiable by the memory controller 20 as a specific destination address (e.g., A0) in the memory mapped I/O memory space 32. The memory controller 20 initiates the write command to the corresponding destination address (e.g., A0) 32, causing the HCA 12 to detect in step 86 the work notification written to the destination address 32. Typically the address is stored in a first in first out (FIFO) memory (not shown), while any data on the data bus associated with the write operation is ignored.

The host manager 68, in response to parsing the destination address (e.g., A0) to service the work notification 30, identifies in step 88 the queue pair context entry 42 corresponding to the work descriptor 16 by matching the destination address 32 with the corresponding notification address 50 stored in the queue pair context entry 42. The host manager 68 retrieves in step 90 the queue pair attributes specified in the identified queue pair context entry 42, including the send queue memory address (e.g., S0) specified at the corresponding identified queue pair context entry 42. The host manager 68 then services the work descriptor 16 by fetching in step 92 the work descriptor 16 based on the send queue memory (e.g., S0) specified in the corresponding identified queue pair context entry 42, via DMA transfer.

According to the disclosed embodiment, work notifications for respective work requests can be identified based on a comparison between a destination address used to write the work notification, and stored notification addresses maintained within a queue pair attributes table configured for storing queue pair context entries. Hence, use of context information stored within the HCA 12 eliminates the necessity of any data structure being generated by a verbs consumer process for the work notification, reducing verbs consumer process resources.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a host channel adapter, the method comprising:

storing a queue pair context entry that specifies, for a corresponding queue pair, queue pair attributes including a corresponding notification address;

detecting a work notification for a work descriptor and that is written to a destination address;

identifying the queue pair context entry corresponding to the work descriptor based on a match between the destination address and the corresponding notification address; and servicing the work descriptor based on the queue pair attributes specified in the identified queue pair context entry.

2. The method of claim 1, wherein the storing step includes storing, as at least a portion of the queue pair attributes, a send queue memory address specifying a memory location for send work descriptors associated with the queue pair and a receive queue memory address specifying a memory location for receive work descriptors associated with the queue pair.

3. The method of claim 2, wherein the servicing step includes fetching the work descriptor based on the send queue memory address specified in the corresponding identified queue pair context entry.

4. The method of claim 3, wherein the detecting step includes detecting the work notification, written to the destination address, from within a prescribed range of memory mapped input/output (I/O) addresses accessable by the host channel adapter.

5. The method of claim 1, wherein the detecting step includes detecting the work notification, written to the destination address, from within a prescribed range of memory mapped input/output (I/O) addresses accessable by the host channel adapter.

6. A channel adapter comprising:

a queue pair attributes table configured for storing queue pair context entries specifying queue pair attributes, including notification addresses, for respective queue pairs; and a host manager configured for detecting a work notification for a work descriptor and that is written to a destination address, the host manager configured for identifying, from the queue pair attributes table, one of the queue pair context entries as corresponding to the work descriptor based on a match between the destination address and the corresponding notification address, the host manager configured for retrieving the work descriptor based on the queue pair attributes specified in the one queue pair context entry.

7. The channel adapter of claim 6, wherein the queue pair attributes table is configured for storing, as at least a portion of the queue pair attributes for each corresponding queue pair, a send queue memory address specifying a memory location for send work descriptors associated with the corresponding queue pair and a receive queue memory address specifying a memory location for receive work descriptors associated with the corresponding queue pair.

8. The channel adapter of claim 7, wherein the host manager is configured for fetching the work descriptor based on the send queue memory address specified in the corresponding identified queue pair context entry.

9. The channel adapter of claim 8, wherein the host manager is configured for detecting the work notification, written to the destination address, from within a prescribed range of memory mapped input/output (I/O) addresses accessable by the host manager.

10. The channel adapter of claim 6, wherein the host manager is configured for detecting the work notification, written to the destination address, from within a prescribed range of memory mapped input/output (I/O) addresses accessable by the host manager.

* * * * *